Patented May 1, 1951

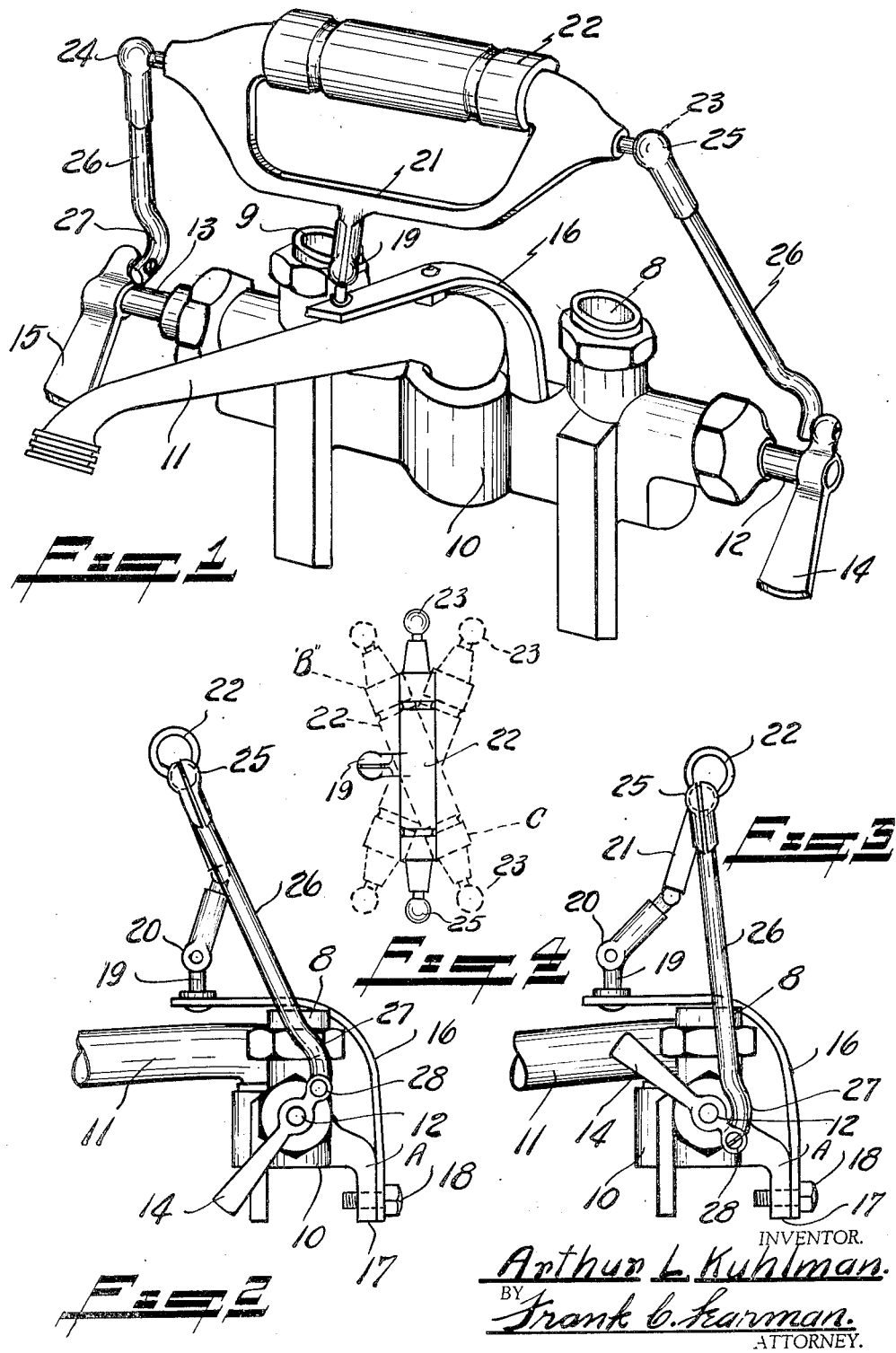

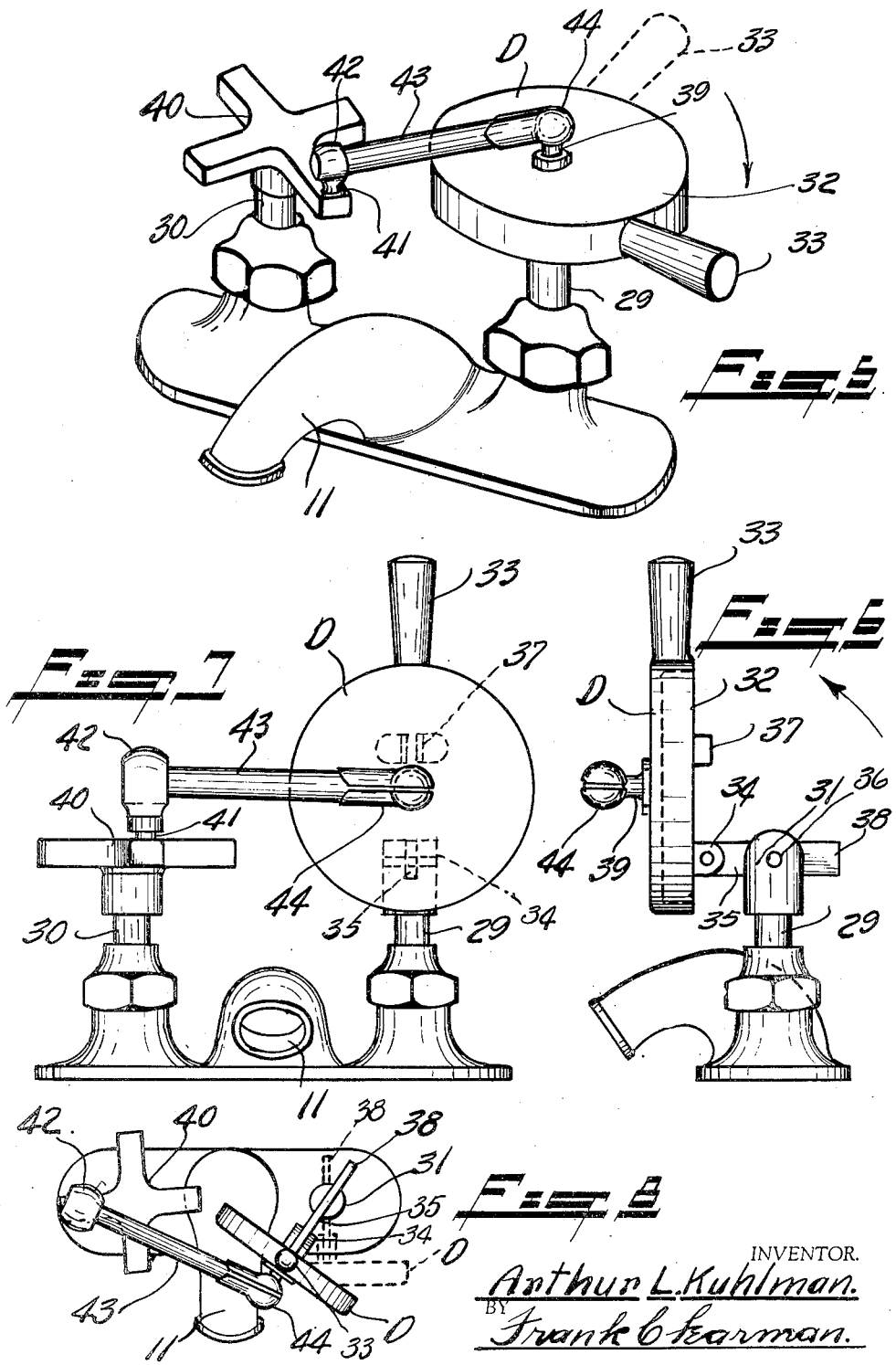

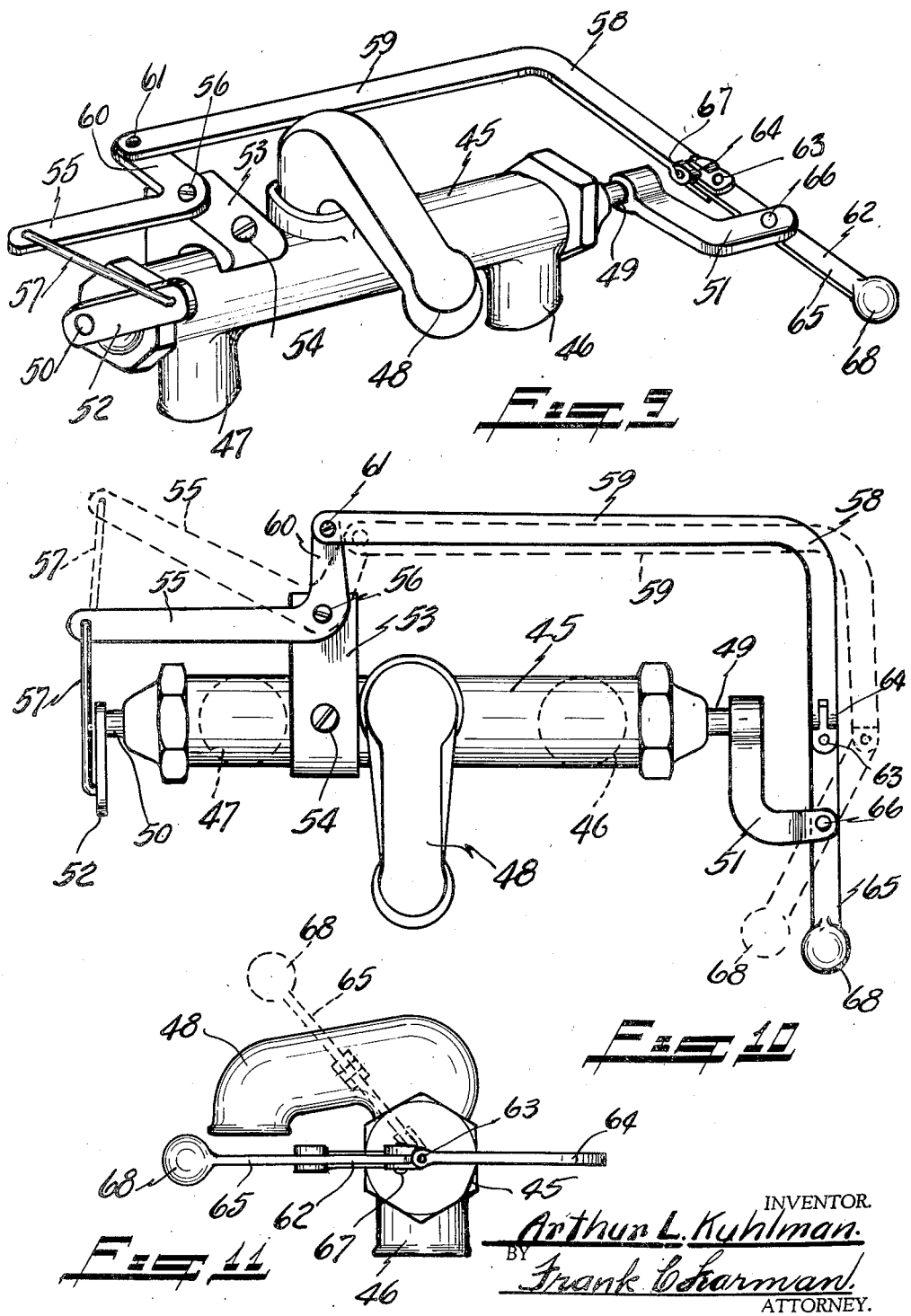

2,551,442

UNITED STATES PATENT OFFICE 2,551,442

VALVE ACTUATING MECHANISM

Arthur L. Kuhlman, Bay City, Mich.

Application October 26, 1945, Serial No. 624,747

3 Claims. (Cl. 137—144)

This invention relates to a manually operable means for controlling the flow and regulating the temperature and volume of liquid discharged from spaced-apart valves.

One of the prime objects of the invention is to provide a valve regulating mechanism whereby both a hot and cold water faucet may be simultaneously actuated for controlling the flow of liquid therethrough.

Another object is to design a valve control mechanism by means of which spaced faucets can be operated either simultaneously or singly as desired, thereby proportioning the flow or mixture from both valves as the liquid is discharged.

A further object is to provide a very simple, practical, and economical mechanism, which can be operated by one hand, for controlling twin faucets either in unison or singly as desired.

A still further object is to provide a mechanism of neat, artistic, and pleasing appearance which can be readily manufactured and assembled, and which can be quickly and easily applied, either to units in the process of manufacture, or to faucets already on the market and in daily use.

With the above and other objects in view, the present invention consists in the combination and arrangement of parts, hereinafter more fully described, illustrated in the accompanying drawings, and more particularly pointed out in the appended claims, it being understood that changes may be made in the form, size, proportions and minor details of construction, without departing from the spirit, or sacrificing any of the advantages of the invention.

In the drawings:

Fig. 1 is a perspective view showing my valve control means in position;

Fig. 2 is a fragmentary end elevational view thereof, with the valves in closed position;

Fig. 3 is a view similar to Fig. 2, showing the mechanism swung and the valves in open position;

Fig. 4 is a top plan view, the solid lines showing the actuating handle in position with the valves closed, the broken lines showing the position of the handle when one valve is open and the other closed;

Fig. 5 is also a perspective view similar to Fig. 1, and showing a slightly modified construction;

Fig. 6 is an end elevational view thereof with the actuating handle swung up for simultaneous operation of the two valves;

Fig. 7 is a front view with the actuating handle swung up;

Fig. 8 is a top plan view, the solid lines showing the mechanism swung to position to open the valves, the broken lines showing the position when the valves are closed;

Fig. 9 is another perspective view similar to Fig. 1 and showing another modified design;

Fig. 10 is a top plan view, the solid lines showing the position of the mechanism when the valves are in closed position, the broken lines showing the mechanism swung to actuate the valve controlling the hot water conduit; and Fig. 11 is an end elevational view, the broken lines showing the control handle swung to position to open the cold water conduit.

Referring now to Figs. 1 to 4 inclusive of the drawings, and in which is shown one embodiment of my invention. The numerals 8 and 9 indicate the hot and cold water supply conduits of a conventional water supply system (not shown), such as used in residences, hotels, and business establishments in general; these conduits opening into a common mixing chamber 10 to which a spout 11 is connected, either swingingly or solid as desired.

Suitable valves (not shown) are interposed in these hot and cold water conduits 8 and 9, and these are of conventional design such as are at present on the market, said valves being provided with stems 12 and 13 respectively, and on which the handles 14 and 15 are mounted to facilitate manipulation thereof.

At present it is common practice to connect hot and cold water conduits to a mixing housing or chamber having a discharge spout connected thereto. Standard valves are provided in these hot and cold water conduits and manipulation of said valves admits the hot and cold water to the mixing chamber, so that the temperature of the discharging liquid can be controlled as desired.

This arrangement, above referred to, requires the use of two hands, or separate manipulation of each individual valve by one hand, which makes for difficult proportioning or mixing etc., and especially so when volume regulation is also desired; and I have, therefore, perfected a simple, substantial, and practical means whereby the both valves can be manipulated, either simultaneously or singly, and by use of one hand only.

The control assembly is comparatively simple; it can be mounted directly on the unit assembly or other support as clearly shown in Figs. 1, 2, and 3 of the drawings; or it can be mounted on the valves proper as shown in Figs. 5 to 8 inclusive, depending on the type of installation and the desires of the trade.

Referring now particularly to the design shown in Figs. 1 to 4 inclusive of the drawings, in which the mechanism is mounted on a strap member 16 which is in turn secured to a lug 17 provided on the unit A by means of a bolt 18.

A ball bolt 19 is mounted on the free, overhanging end of the strap 16 and a socket sleeve 20 cooperates with the ball bolt 19, said sleeve being mounted on the extension 21 which is connected to a handle 22, said handle being provided with laterally projecting ball members 23 and 24 respectively, and to which a socket sleeve or member 25 is connected in the conventional manner, a link 26 being inserted or otherwise secured to said socket sleeve, the lower end being curved as at 27 with the extreme end pivotally connected to the upper ends of the handles 14 and 15 by means of a screw 28.

The ball joints 19, 23, and 24 permit the handle 22 to be swung in any direction to regulate the flow as desired; for instance, when the handle is in position shown in Fig. 2 of the drawings, both valves are closed, and when the handle is swung to position shown in Fig. 3, both valves will be in open position. Partial opening or closing of either valve is accomplished by rotation of the handle 22 on the ball joint 19; for example, when the handle is in position indicated at B in Fig. 4, the cold water valve will be open and the hot water valve closed, or by rotating the handle to position indicated at C, the cold water valve will be closed and the hot water valve opened, and by a limited rotative movement, the degree of opening can be controlled as desired.

Referring now to Figs. 5 to 8 inclusive in which I have shown an alternate construction and in which the valve stems 29 and 30 are vertically disposed, a bushing 31 being provided on the stem 29, and a control handle D is adjustably mounted thereon, said handle including a disk 32 having a horizontally disposed handle 33 for easy manipulation, ears 34 being provided on said disk, and a link 35 is pivotally secured thereto, said link 35 being also secured to the bifurcated end of the bushing 31 by means of the pin 36. Spaced apart downwardly projecting ears 37 are provided on the lower face of the disk, and when the disk is swung down to position as shown in Fig. 5, these ears 37 will engage the projecting end 38 of the link 35 to provide a stable connection thereat.

A centrally disposed ball bolt 39 is provided on the disk 32, and I wish to direct particular attention to the fact that the pivotal connection of the link 35 to the disk is offset from the valve stem 29 and for a purpose to be presently described.

A conventional handle 40 is mounted on the valve stem 30 and a pin 41 is mounted off-center thereon, a bracket 42 being revolvably mounted on said pin and is suitably bored to accommodate one end of a rod 43 which is secured therein, the opposite end of the rod being provided with a sleeve and socket 44 for universal attachment to the ball bolt 39 so that the valves can be simultaneously actuated.

For example, when the disk is in position shown in solid lines in Fig. 5 of the drawings, the valve stem 29 can be operated to open or close the cold water conduit without in any manner effecting the valve stem 30; the operator grasps the handle 33, rotating it as desired, and inasmuch as the universal joint 39 is centrally disposed, such movement will not affect the companion valve stem 30; but when the disk 32 is swung upwardly about the pivot pin 34 to position as indicated in Fig. 6 of the drawings, the valves may be simultaneously actuated in unison because the point of connection of the bracket 42 to the handle 40 is off-center with relation to the valve stem 30 and when the disk 32 is held in raised position, it also will be off-center with relation to the valve stem 29; therefore, it is merely necessary to hold the disk raised and rotation of the disk about the stem 29 will actuate both valves accordingly. It will, therefore, be obvious that these valves may be operated in unison, or each valve may be operated independently of its companion valve, the principle being the same as disclosed in Figs. 1 to 4.

Referring now to the construction shown in Figs. 9 to 11 inclusive of the drawings, the unit comprises a mixing chamber 45 having hot and cold water conduits 46 and 47 opening thereinto and a discharge spout 48 is provided as usual.

The valves (not shown) are horizontally disposed, the valve stems 49 and 50 being connected thereto as usual, and valve handles 51 and 52 are mounted on these stems for manipulation in the conventional manner. The valve control mechanism proper is of unique design. It is mounted on a bracket 53 which is secured to the unit by means of the screw 54, and includes an angularly-shaped lever 55 which is pivotally mounted on the bracket 53 at the point 56, and link 57 connects one leg of the lever 55 with the handle 52.

The lever 55 is actuated by an angularly-shaped lever 58, the leg 59 being pivotally connected to the leg 60 of the lever 55 at the point 61, the opposite leg being pivotally connected to a link 62 by means of the pin 63, the opposite end 64 of the link 62 is bifurcated as shown and for a purpose to be presently described; and I wish to direct particular attention to the fact that this pivotal connection is in direct horizontal alignment with the valve stems 49 and 50.

A control lever 65 is pivotally connected to the lever 51 at a point intermediate its length and as indicated at 66, the inner end of said lever being pivotally connected to the bifurcated end 64 of the link 62 at the point 67, so that said lever may be swung in an arc about the pivot point 66 for operation of the valve stem 49 as desired, a ball end 68 being provided on the end of the control lever so that it may be readily grasped.

It will be noted that the link 62 provides for pivotal movement in both a horizontal and vertical plane, so that either valve may be independently actuated and controlled, or they may be actuated in unison when desired; for example, to actuate the cold water valve it is merely necessary to swing the control handle upwardly about the pivot pin 67 in the direction indicated by the arrow in Fig. 11 of the drawings, the range of movement being dependent on the volume desired.

To actuate the hot water valve, the control valve is swung horizontally in direction as indicated in broken lines in Fig. 10 of the drawings; this in turn swings the lever 55 about the pivot 56 and the link 57 serves to swing the handle 52 in the direction as indicated by the arrow, thus actuating the hot water valve accordingly.

To operate both valves in unison, the operator swings the control handle upwardly and inwardly, the range of movement in the respective directions determining the degree of valve opening so that desired volume and/or temperature can be secured and accurately controlled.

It will, of course, be obvious that the link 62 may be in the form of a universal joint if desired, and various other modifications may be resorted to when the units are other than standard design or arrangement.

The general construction and arrangement is capable of various modifications for securing the same result. Gears, or chain and sprocket arrangements (not shown) may be used, and such installations would preferably be covered to harmonize with the balance of the installation, also a link to increase the range of valve regulation may be installed on either or both valves to provide a greater range in exceptional cases, or for special requirements.

From the foregoing description, it will be obvious that I have perfected a very simple, practical, and economical valve actuating arrangement and mechanism for controlling by one hand, the volume and/or temperature of liquid discharged from single or twin valves.

What I claim is:

1. A regulating mechanism of the class described, comprising a support, spaced-apart valves having handles thereon, a horizontally disposed operating handle removably mounted on said support, ball-shaped sections on the free ends of the operating handle, and links having one end universally connected to said ball-shaped sections with the opposite ends pivotally connected to said valve handles.

2. The combination defined in claim 1 in which said links are curved at a point directly adjacent their point of connection to said valve handle to permit free swinging movement thereof, with the pivotal connection to the short end of the valve handle.

3. The combination set forth in claim 1 in which horizontally disposed pintles project from the ends of the horizontally disposed handle with the ball-shaped sections formed integral therewith.

ARTHUR L. KUHLMAN.

REFERENCES CITED

The following references are of record in the file of this patent:

UNITED STATES PATENTS

| Number | Name | Date |
|---|---|---|
| 1,176,784 | Speiden | Mar. 28, 1916 |
| 2,033,941 | Kryzanowsky | Sept. 18, 1926 |